United States Patent
Knechtel et al.

[15] 3,703,334
[45] Nov. 21, 1972

[54] ELECTROPHOTOGRAPHIC APPARATUS

[72] Inventors: Wilhelm Josef Knechtel, Paulinen Str. 24, Rodheim; Detlef Schaffer, Kornmarkt 6, Wetzlar, both of Germany

[22] Filed: July 13, 1970

[21] Appl. No.: 54,335

[30] Foreign Application Priority Data

July 14, 1969 Germany..........P 19 35 617.3

[52] U.S. Cl. ..................355/11, 355/57, 355/58, 355/60, 355/66
[51] Int. Cl. ..................G03g 15/00, G03b 27/34
[58] Field of Search..................355/3, 11, 55–63, 355/66

[56] References Cited

UNITED STATES PATENTS 2,051,392  9/1936  Rantsch et al. ..........355/66 X
2,940,358  6/1960  Rosenthal..................355/66
3,535,033  10/1970  Busch ......................353/99 X
3,183,767  5/1965  Brownscombe .........355/65 X
3,572,587  10/1969  Liquori....................353/99 X Primary Examiner—Samuel S. Matthews
Assistant Examiner—Richard M. Sheer
Attorney—Watson, Leavenworth and Kelton

[57] ABSTRACT

The system includes a first mirror for reflecting light images onto the photosensitive member in first magnification and a second mirror selectively movable from an inoperative to an operative position for reflecting light images onto the member in second magnification different from the first magnification. The system also includes a lens selectively movable to focus the image applied to the photosensitive member by the operative mirror.

5 Claims, 3 Drawing Figures

ELECTROPHOTOGRAPHIC APPARATUS

BACKGROUND OF THE INVENTION

1. Field of the Invention

This invention relates to electrophotographic apparatus in which the optical image of an original to be copied is formed on electrostatically charged paper, foil or like material by an optical image forming system which incorporates means for changing magnification.

2. Description of the Prior Art

The change of magnification in electrophotographic apparatus is such that an original of the standard format DIN A3 or DIN A4 is copied as DIN A4 or DIN A5. An original of the standard format DIN A4 or DIN A5 is copied into the same size.

For this purpose, use is actually made of two magnifications, i.e., magnification 1 : 1 and magnification 1 : 0.7. Such a change of magnification is achieved by the movement of an image forming objective lens.

As known, however, such movement causes the sharpness of the formed image to be lost. To prevent this, known apparatus uses an objective lens whose focal distance is varied as the lens is moved, or alternatively the optical distance of the path of image forming light is varied by guided movement of a mirror in accordance with guided movement of the objective lens so as to maintain the formed image sharp to thereby accomplish perfect image formation.

Such an arrangement requires a great cost and consequently the entire apparatus becomes quite expensive. In the first case mentioned above, there is a need to employ an expensive objective lens whose optical distance is variable, and in the second case a highly demanding requirement is imposed upon the guides, especially the guide for the moving mirror, since any angular deviation of the mirror would cause the optical image of an original to be displaced and, accordingly, the mirror must be moved strictly in parallel.

SUMMARY OF THE INVENTION

The object of the present invention is to provide a mechanism which can maintain a sharp image formation and change magnification without requiring a great expense.

Such object of the present invention can be achieved by rotating a mirror in the path of image forming light in such a manner as to vary the optical distance of the light path.

The rotation of the mirror is accomplished highly accurately by a simple method, since the axis of rotation of the mirror is always fixed and the final position of the mirror after its rotation is determined by equipment fixed with respect to the mirror.

A fixed mirror is provided in the path of image forming light so that the path is determined by this mirror with the objective lens in one position, and it has been found advantageous to rotate a rotatable mirror in front of the fixed mirror so as to change the path with the objective lens in the other position. The rotatable mirror may conveniently be positioned by a motor and the final position of the rotatable mirror may conveniently be determined by switches actuated by a control disc.

The rotatable mirror also solves very simply another problem peculiar to apparatus of the subject type. During the image formation, a perfectly constant quantity of light is required to form an electrostatic latent image on photocopying paper.

The density of light in the image forming surface is varied when the magnification is changed. This causes the electrostatically charged paper to receive too much or too little light in one and/or the other position of the objective lens, thus resulting in an unsatisfactory copy.

In order to eliminate such a disadvantage, some machines employs an iris opened and closed in response to the objective lens or a filter inserted in the path of image forming light.

Such a filter or an iris therefor and the control means therefor have made the machine quite expensive.

According to the present invention, the problem of compensation for brightness can be solved by the fact that one of the two mirrors provided has a different reflection factor than the other mirror.

With this arrangement, brightness in the surface illuminated is automatically controlled and is unchanged upon the rotation of the rotatable mirror.

The original is exposed to light such as flashlight for the image formation, and therefore, in another form of the present invention, the intensity of sources of light, especially sources of flashlight, is controlled. Means for this purpose is sufficient to compensate for various emissions qualified by an original having various colors or tones.

The present invention will be described by way of example with reference to the accompanying drawings.

DESCRIPTION OF THE PREFERRED EMBODIMENTS

Figure 1:
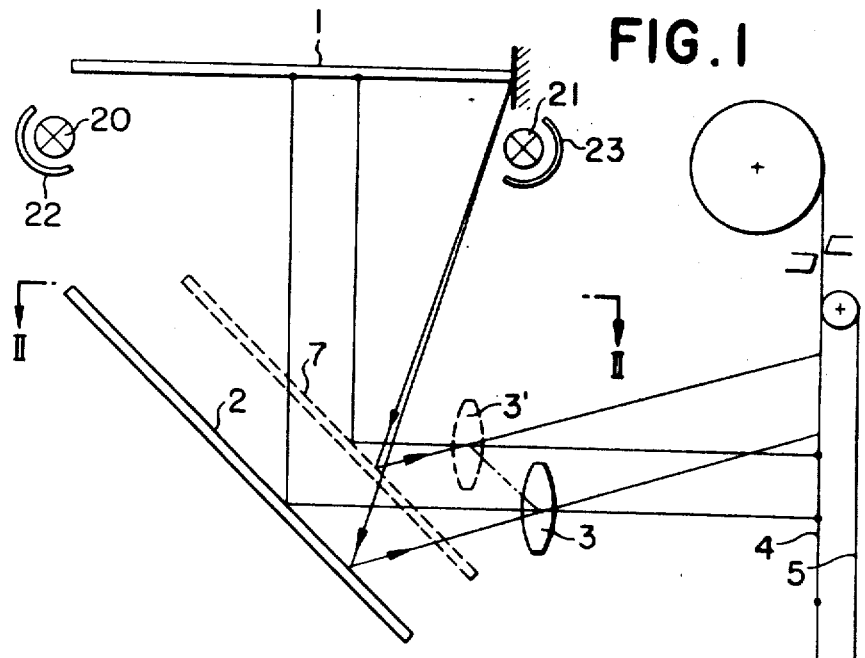
FIG. 1 is a schematic diagram showing the present invention.

Referring to FIG. 1, an original to be copied is placed on a window 1 so that the optical image of the original is formed in an image forming plane 4 with the aid of a mirror 2 and an objective lens 3. A transport belt 5 transports electrostatically charged paper 6 into the image forming plane 4.

When the optical image of the original is formed on the paper 6, there is formed an electrostatic latent image, which will be developed by an unshown developing device.

If the magnification must be changed in image formation, the lens 3 is moved to position 3'. In this position, a mirror 7 indicated by broken lines is brought into the path of light so that a sharp image may be formed. Lens 3 is mounted as shown in FIG. 2 for movement to limit stop 15 on screw 14 in response to rotation thereof by motor 13.

Figure 2:
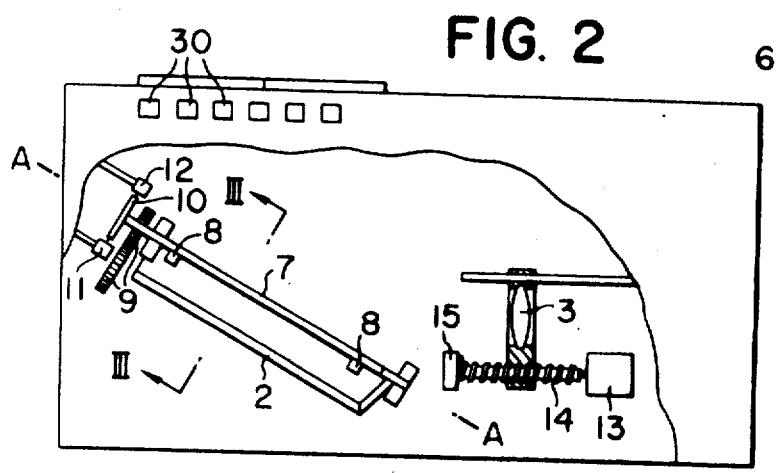
FIG. 2 is a sectional view taken along line II—II of FIG. 1.
Figure 3:
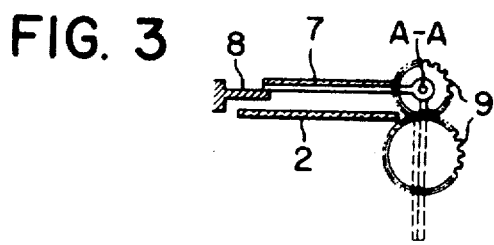
FIG. 3 is a sectional view taken along line III—III of FIG. 2.

As seen in FIG. 2 and FIG. 3, the mirror 7 is operative about an axis A-A. In its rotated position, the mirror is supported by an element 8. The rotation of the mirror is accomplished by a gear 9. Mounted on the shaft of the mirror is a cam 10, which actuates two microswitches 11 and 12 which in turn limit the rotational movement of the mirror.

The mirror 2 has a lower reflection factor than the mirror 7. This compensates for the variation in the density of light in the image forming plane 4 resulting from the movement of the objective lens.

The original to be copied is illuminated by two xenon tubes 20 and 21. Mirrors 22 and 23 reflect light emitted backwardly by the xenon tubes, thereby increasing the efficiency of luminescence.

The brightness of the flashlights 20 and 21 may be controlled.

Therefore, illumination of the original can be adjusted in accordance with the quantity of light emitted by the original depending on the absorption factor thereof.

The movement of the objective lens 3 and the rotation of the mirror 7 may be accomplished simply by depressing one of push buttons 30. Each of the push buttons is used to control the format, for example, from DIN A3 to DIN A4, from DIN A4 to DIN A4, from DIN A4 to DIN A5 or from DIN A5 to DIN A5.

What is claimed is:

1. Electrophotographic apparatus including a system for varying the magnification of images of an original projected onto a member having a photosensitive surface, comprising:
   a. first and second support means fixedly mounted in said apparatus respectively for supporting said original and said member during image projection;
   b. means for illuminating said original to provide a light image thereof;
   c. reflective means including a first mirror supported in said apparatus and defining an optical path of first predetermined length between said original and said photosensitive surface for reflecting said light image onto said photosensitive surface in first magnification and a second mirror supported in an inoperative position in said apparatus and selectively movable therefrom to a predetermined operative position and therein defining an optical path of second predetermined length between said original and said photosensitive surface for reflecting said light image onto said photosensitive surface in second magnification different from said first magnification; and
   d. an objective lens supported for movement in said apparatus into first or second predetermined positions respectively for focusing said light image in said first or in said second magnification on said photosensitive surface.

2. The apparatus claimed in claim 1 further including a motor for moving said second mirror into said operative position, a cam associated with said second mirror and switch means actuated by said cam on movement of said second mirror into said operative position.

3. The apparatus claimed in claim 1 wherein said mirrors have different reflection factors.

4. The apparatus claimed in claim 3 wherein said first mirror provides a higher image magnification than said second mirror and has a higher reflection factor than said second mirror.

5. The apparatus claimed in claim 1 wherein said illuminating means includes at least one flashlight whose luminescence is adjustable.

* * * * *

UNITED STATES PATENT OFFICE
CERTIFICATE OF CORRECTION

Patent No. 3,703,334      Dated November 21, 1972

Inventor(s) Wilhelm Josef Knechtel et al.

It is certified that error appears in the above-identified patent and that said Letters Patent are hereby corrected as shown below:

Title page, insert --[73] Assignee: Canon Kabushiki Kaisha Tokyo, Japan--.

Title page, item [56] "9/1936" should read --8/1936--; "3,572,587" should read --3,472,587--; "Liquori" should read --Liguori--.

Title page, item [57], line 1, before "The" insert --A system for use in electrophotographic apparatus to provide different magnifications of light images of originals applied to a photosensitive member.--

Column 1, line 12, after "The" insert --customary--.

Column 2, line 9, "machines employs" should read --machines employ--.

Signed and Sealed this

Seventh Day of June 1977

[SEAL]

Attest:

RUTH C. MASON
*Attesting Officer*

C. MARSHALL DANN
*Commissioner of Patents and Trademarks*